United States Patent [19]
Nakama et al.

[11] Patent Number: 5,289,551
[45] Date of Patent: Feb. 22, 1994

[54] WYE-BRANCHING OPTICAL CIRCUIT

[75] Inventors: Kenichi Nakama; Shigeru Kobayashi, both of Osaka, Japan

[73] Assignee: Nippon Sheet Glass Co., Ltd., Osaka, Japan

[21] Appl. No.: 782,823

[22] Filed: Oct. 25, 1991

[30] Foreign Application Priority Data

Nov. 5, 1990 [JP] Japan ............................ 2-299581

[51] Int. Cl.$^5$ ............................ G02B 6/00; G02B 6/36
[52] U.S. Cl. ............................................................. 385/45
[58] Field of Search ............................ 385/45, 39, 53

[56] References Cited

U.S. PATENT DOCUMENTS

| | | | |
|---|---|---|---|
| 3,453,036 | 7/1969 | Swope et al. | 385/45 |
| 4,674,827 | 6/1987 | Lzutsu et al. | 385/45 |
| 4,760,580 | 7/1988 | Thompson et al. | 385/45 |
| 4,846,540 | 7/1989 | Kapon | 385/45 |
| 5,016,960 | 5/1991 | Eichen et al. | 385/45 X |
| 5,046,800 | 9/1991 | Blyler, Jr. et al. | 385/45 |
| 5,093,876 | 3/1992 | Henry et al. | 385/45 |
| 5,111,517 | 5/1992 | Riviere | 385/45 X |
| 5,148,505 | 9/1992 | Yanagawa et al. | 385/45 X |

OTHER PUBLICATIONS

Applied Physics Letters, vol. 56, No. 2, Jan. 8, 1990. pp. 120–121 By Shani et al. "Integrated Optic Adiabatic Polarization Splitter on Silicon".
Paper No. 369 "Characteristics of Single-Mode Y Branch Waveguides By A Thermal Ion Exchange Process"-presented by Sugawara, Hashizume, and Seki (1962).
"Two Step Purely Thermal Ion-Exchange Technique For Single-Mode Waveguide Devices In Glass"-Electronics Letters, Sep. 29, 1988, vol. 24, No. 20 pp. 1258–1259.
Applied Physics Letters, vol. 56, No. 2, Jan. 8, 1990, New York US pp. 120–121; Y. Shani et al. "Integrated optic adiabatic polarization splitter on silicon".
Patent Abstracts of Japan, vol. 9, No. 33 (P-334)(1756) Feb. 13, 1985 and JP-A-59 177 503 (Fujitsu K.K.) Oct. 8, 1984.
Electronics Letters, vol. 8, No. 10, May 18,1972, ENAGE GB pp. 262–263; W. A. Gambling et al.; "Novel mode filter for use with cladded-glass and liquid-core optical waveguides".
European Search Report.

*Primary Examiner*—Akm E. Ullah
*Attorney, Agent, or Firm*—Sughrue, Mion, Zinn, Macpeak & Seas

[57] ABSTRACT

A wye-branching optical circuit including an input waveguide and at least two output waveguides, which are single mode waveguides or multi-mode waveguides in which only several modes are propagated. The waveguides are formed in a substrate, wherein a portion of the input waveguide is a low effective refractive index waveguide where higher order modes are cut-off, and the effective refractive index of a fundamental mode is lower than in the other waveguides formed in the substrate.

9 Claims, 2 Drawing Sheets

WYE-BRANCHING OPTICAL CIRCUIT

BACKGROUND OF THE INVENTION

This invention relates to a wye-branching optical circuit having a Y-shaped waveguide, and more particularly to a wye-branching optical circuit having an improved stable branching ratio by suppressing the variation in branching ratios for a range of wavelengths which is caused when the incident light is axially shifted.

A conventional wye-branching optical circuit, shown in FIG. 1, includes an input waveguide 1 and output waveguides 2 and 3, which have equal sectional configurations and refractive indexes. The waveguides 1, 2, and 3 meet at a branching portion 4, thus providing a Y-shaped optical circuit. When only the fundamental mode of a wavelength is excited for the input waveguide 1, the optical power is divided equally at the branching portion 4 and applied to the output waveguides 2 and 3.

In the above described wye-branching optical circuit, if only the fundamental mode of a wavelength is excited for the input waveguide 1, a branching ratio of approximately 50:50 is obtained. This is not a problem.

On the other hand, for instance, when the axis of the incident light is slightly shifted, the higher order modes and leaky modes, in addition to the fundamental mode, are excited in the input waveguide. In this case, at the branching portion 4, the field distributions of the higher order modes and leaky modes depend on the wavelength, and the optical powers of these modes, which are applied to the output waveguides 2 and 3, are changed. That is, the branching ratio deviates from 50:50. Thus, the branching ratio is variable within a certain range of wavelengths. This is a problem.

Even if the axis of the incident light is not shifted, the following problem may result. For example, if the dimensions of the waveguides are not exact or vary, the higher order modes and leaky modes are excited, giving rise to similar problems associated with an axial shift of the incident light, as described above.

This phenomenon occurs particularly when light emerging from a single mode fiber is applied to the input waveguide of the wye-branching optical circuit with its axis shifted from the axis of the input waveguide.

FIG. 2 illustrates an example of the wavelength loss characteristic for light emerging from a single mode fiber which is axially shifted when applied to the input waveguide 1 of the conventional wye-branching optical circuit manufactured according to a two step purely thermal ion-exchange process. The two step purely thermal ion-exchange process is disclosed in Paper No. 369 which was presented by Sugawara, Hashizume and Seki in the nationwide meeting of the Electronic Data Communications Society Semiconductor and Material Field held in 1987, and in "Two-step purely thermal ion-exchange technique for single-mode waveguide devices on glass" [Electron Lett., Vol. 24, No. 20, pp.1258–1259 (1988)] presented by Sugawara, Hashizume and Seki.

Briefly, the two step purely thermal ion-exchange process includes covering a surface of a glass substrate with an ion penetration preventing mask film, forming an opening in the mask film according to a predetermined waveguide pattern, and bringing the mask film covered glass substrate into contact with a fused salt containing univalent cations, so that the ions in the salt are exchanged with the ions in the glass and vice versa. As a result, a high refractive index region substantially semi-circular in cross-section is formed in which the refractive index is gradually decreased towards the inside from the opening of the mask film. Thereafter, the mask film is removed, and the glass substrate is brought into contact with the fused salt including univalent cations which are effective in decreasing the refractive index of glass.

As a result of the two step purely thermal ion-exchange process, the maximum refractive index center of the high refractive index region moves from the surface of the substrate towards the back while the high refractive index region becomes substantially circular in cross-section.

The conventional wye-branching optical circuit thus described is made of linear waveguides for a single mode having a wavelength longer than 1.35 $\mu$m, with the axis of the incident light shifted by $+2$ $\mu$m in the direction X from the axis of the input waveguide 1. In this case, as shown in FIG. 2, the branching ratio is constant with wavelengths longer than 1.40 $\mu$m. Accordingly, for wavelengths in the range from 1.35 $\mu$m to 1.40 $\mu$m, the branching ratio changes because of the leaky modes propagating in the input waveguide 1, and for wavelengths shorter than 1.35 $\mu$m, the branching ratio changes because of the higher order modes and leaky modes propagating in the input waveguide 1.

Related to the above-described phenomenon, the conventional wye-branching optical circuit is disadvantageous for the following reasons. That is, even though the single mode fiber is set in alignment with the input waveguide so that the branching ratio is 50:50 with one wavelength, the branching ratio varies for a range of wavelengths when the axis of the light applied to the input waveguide is slightly shifted from the axis of the waveguide or when the dimensions of the waveguides are not exact or vary. That is, the branching ratio of the conventional wye-branching optical circuit is not very stable.

SUMMARY OF THE INVENTION

The foregoing objects of the invention are achieved by providing a wye-branching optical circuit in which at least a part of an input waveguide is formed with a low effective refractive index waveguide portion where higher order modes are cut-off and the effective refractive index of a fundamental mode is lower than in the other waveguides formed in the substrate, such that the higher order modes and leaky modes propagating in the input waveguide are led into the substrate at the low effective refractive index waveguide portion.

For situations where the input waveguide has a low effective refractive index waveguide portion, it is necessary to eliminate the high order modes and leaky modes after propagation through the low effective refractive index, which are excited because the dimensions of the waveguides are not exact or vary. For this reason, it is preferable to position the low effective refractive index waveguide portion as close to the branching portion as possible.

The higher order modes and leaky modes propagating in the input waveguide are led into the substrate at the low effective refractive index waveguide portion, and only the fundamental mode is applied to the branching portion. Therefore, the optical power in the input waveguide is applied equally to the two output waveguides. Hence, in the wye-branching optical circuit, unlike the conventional wye-branching optical circuit, the branching ratio is only slightly changed when the incident light is shifted from the axis of the input waveguide or when the dimensions of the waveguides are not exact or vary. That is, the branching ratio can be approximately 50:50 with a wide range of wavelengths.

In accordance with the above and other objects, the present invention provides a wye-branching optical circuit including an input waveguide and at least two output waveguides, which are single mode waveguides or multi-mode waveguides in which only several modes are propagated, the waveguides being formed in a substrate, wherein a portion of the input waveguide is a low effective refractive index waveguide where higher order modes are cut-off, and the effective refractive index of a fundamental mode is lower than in the other waveguides formed in the substrate.

Further in accordance with the above and other objects, the present invention provides a wye-branching optical circuit which includes an input waveguide portion having a low effective refractive index waveguide portion and two connecting waveguides respectively extending from a forward and a rearward end of the low effective refractive index waveguide portion and at least two output waveguides coupled to one of the two connecting members.

The above and other objects, features, and advantages of the present invention will become more apparent from the following detailed description taken in conjunction with the accompanying drawings.

DESCRIPTION OF THE PREFERRED EMBODIMENTS

Figure 3:
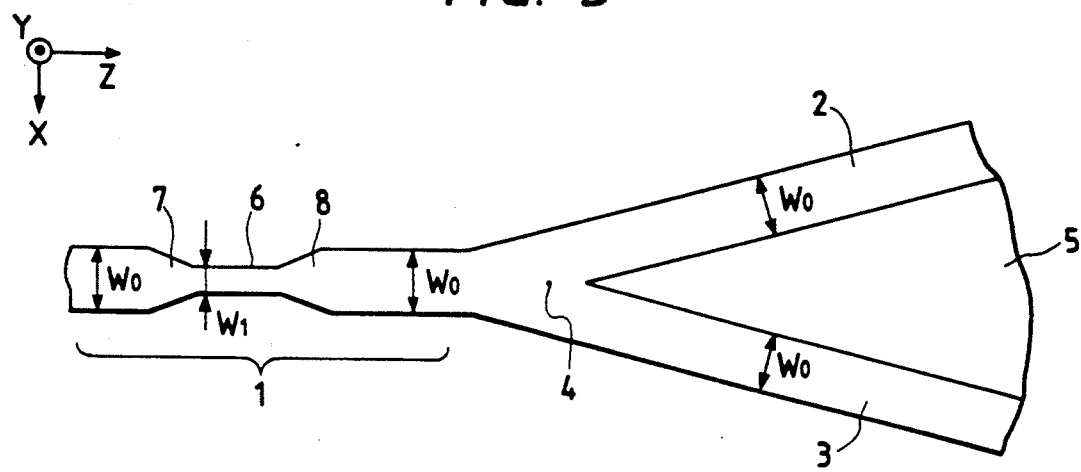
FIG. 3 is a plan view showing a wye-branching optical circuit in accordance with one embodiment of the invention.

FIG. 3 is a plan view showing an example of a wye-branching optical circuit in accordance with the invention. The wye-branching optical circuit includes an input waveguide 1, and two output waveguides 2 and 3. The waveguides 1, 2, and 3, which meet at a branching portion 4 to form a Y-shaped optical circuit, are linear waveguides having a refractive index $N_0$ and width $W_0$. The input waveguide 1 includes a low effective refractive index waveguide portion 6 whose width $W_1$, is smaller than the width $W_0$, and connecting waveguide portions 7 and 8 which are respectively extended from the front and rear ends of the waveguide portion 6, in such a manner that their width gradually changes from $W_1$ to $W_0$.

The refractive index of the low effective refractive index waveguide portion 6 is smaller than that of the input waveguide 1, by 0.0004, for example.

Figure 1:
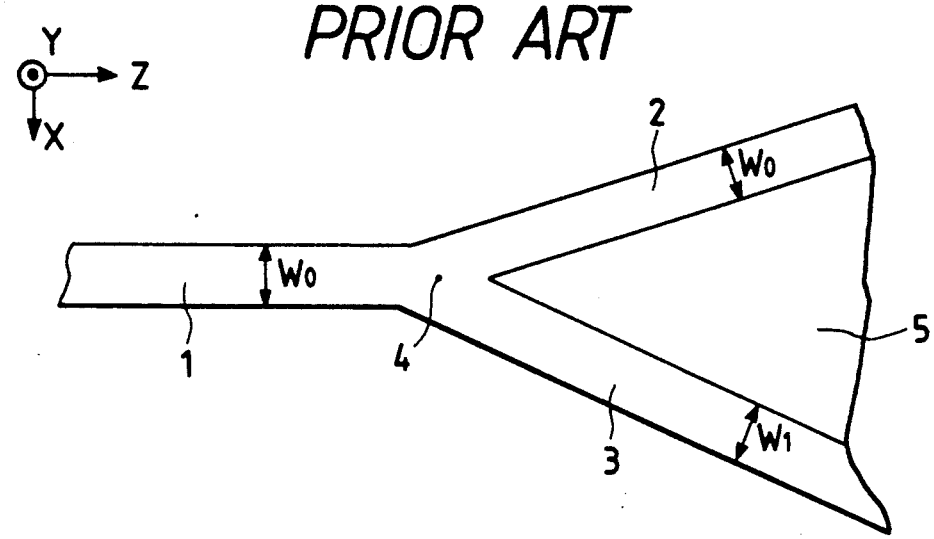
FIG. 1 is a plan view showing a conventional wye-branching optical circuit.
Figure 2:
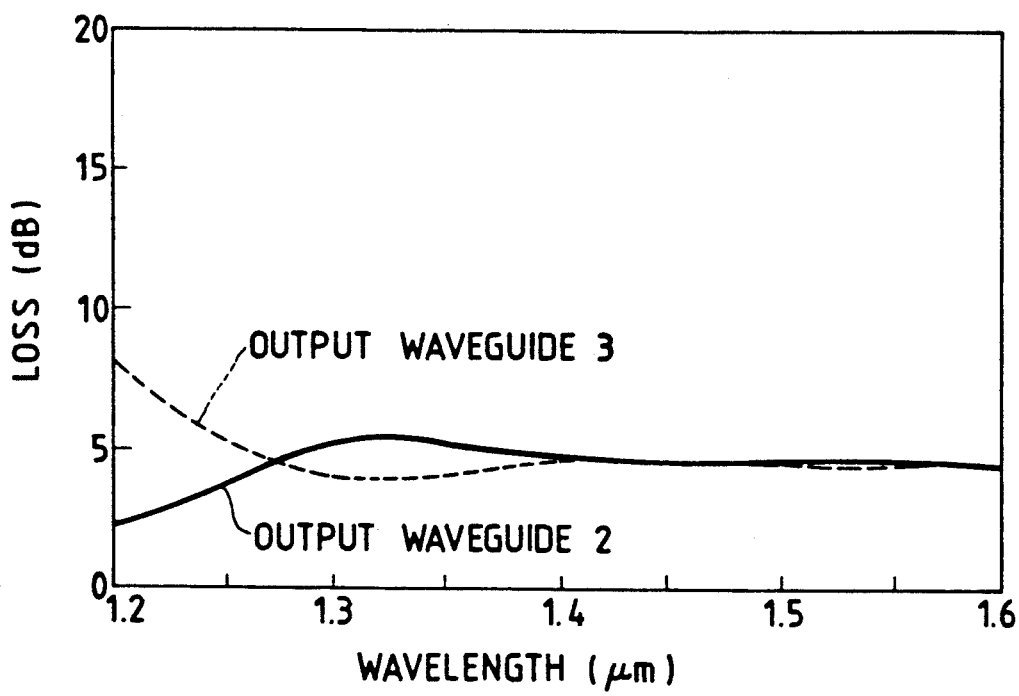
FIG. 2 is a graphical representation indicating the loss of the conventional wye-branching optical circuit of FIG. 1, formed according to the two step purely thermal ion-exchange process.
Figure 4:
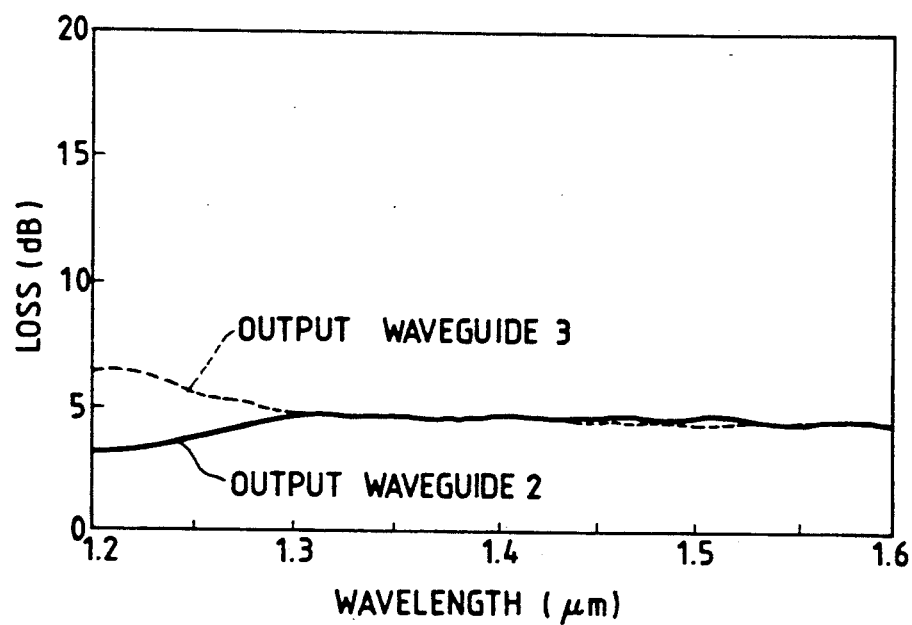
FIG. 4 is a graphical representation indicating the loss of the wye-branching optical circuit of FIG. 3, according to the invention formed according to a two step purely thermal ion-exchange process.

FIG. 4 graphically illustrates the wavelength loss characteristic for light emerging from a single mode fiber, which is axially shifted when applied to the input waveguide 1 of the wye-branching optical circuit. The wye-branching optical circuit was manufactured according to the two step purely thermal ion-exchange process. The axis of the light is shifted by +2 $\mu$m in the direction X from the axis of the input waveguide 1, which is the same as in the above case relating to FIG. 2. The ion exchange condition was the same as that in the case of FIG. 2.

The input waveguide 1 and the output waveguides 2 and 3 are linear waveguides for a single mode with a wavelength longer than 1.35 $\mu$m. In order to lead the high order modes and leaky modes with wavelengths around 1.35 $\mu$m, which propagate in the input waveguide 1, into the substrate 5 at the low effective refractive index waveguide portion 6, the mask opening in the ion exchange preventing film of the low effective refractive index waveguide portion 6 has a width 0.67 times the width of the mask opening of the input waveguide 1, and a length of 2 mm. In wye-branching optical circuit thus constructed, the variation in branching ratio is suppressed for a wavelength range from 1.31 $\mu$m to 1.40 $\mu$m when the axis of the light was shifted from the axis of the input waveguide.

In accordance with the invention, the low effective refractive index waveguide portion 6 is formed as follows.

A part of the input waveguide 1 is decreased in width in the direction X and its refractive index is slightly reduced. However, the low effective refractive index waveguide portion can also be formed by decreasing its length in the directions X and Y, while the refractive index remains unchanged. Alternatively, the low effective refractive index waveguide portion can be obtained by decreasing the refractive index, while maintaining the width of the low effective refractive index waveguide portion constant. Hence, with the effective refractive index of the low effective refractive index waveguide portion 6 decreased, and with about the cut-off wavelength of the higher order modes propagating in the input waveguide 1, the higher order modes and leaky modes are led into the substrate.

If the ratio of the refractive indexes is excessively high, then the distribution becomes steep so that a mode conversion loss is likely to occur. On the other hand, if the ratio is excessively low, the effect of the invention cannot be sufficiently produced. Therefore, it is preferable that the effective refractive index of the waveguide portion 6 be approximately 0.50 to 0.90 times the refractive index of the incident and output waveguides.

In the wye-branching optical circuit according to the invention, the higher order modes and leaky modes propagating in the input waveguide are led into the substrate at the low effective refractive index waveguide portion so that only the fundamental mode is applied to the branching portion. Hence, the optical power in the input waveguide is equally and stably applied to the two output waveguides.

There has thus been shown and described a novel wye-branching optical circuit which fulfills all the objects and advantages sought therefor. Many changes, modifications, variations, and other uses and applications of the subject invention, will, however, become apparent to those skilled in the art after considering the specification and the accompanying drawings which disclose preferred embodiments thereof. All such changes, modifications, variations, and other uses and applications which do not depart from the spirit and scope of the invention are deemed to be covered by the invention which is limited only by the claims which follow.

What is claimed is:

1. A wye-branching optical circuit comprising:
an input waveguide portion comprising a low effective refractive index waveguide portion and two connecting waveguides respectively extending from a forward and rearward end of said low effective refractive index waveguide portion, said connecting waveguides having a refractive index larger than said low effective refractive index waveguide portion;
a branching portion having first and second ends, said first end being connected to one of said two connecting waveguides of said input waveguide portion; and
at least two output waveguides connected to said second end of said branching portion.

2. The wye-branching optical circuit as recited in claim 1, wherein said low effective refractive index waveguide portion has a first predetermined width.

3. The wye-branching optical circuit as recited in claim 2, wherein said output waveguides have a second predetermined width.

4. The wye-branching optical circuit as recited in claim 3, wherein a width of said connecting members range from said first predetermined width to a second predetermined width.

5. The wye-branched optical circuit as recited in claim 4, wherein said second predetermined width is larger than said first predetermined width.

6. The wye-branching optical circuit as recited in claim 1, wherein said input waveguide portion and said output waveguides are linear waveguides for a single mode with a wavelength longer than 1.35 $\mu$m and said low effective refractive index waveguide portion has a length of about 2 mm.

7. The wye-branching optical circuit as recited in claim 6, including a substrate for forming said wye-branching optical circuit according to a two step purely thermal ion-exchange process using an ion penetration preventing mask film, an opening in said mask in the region of said low effective refractive index waveguide portion having a width substantially 0.67 times the width of an opening in said mask in the region of said connecting waveguides.

8. The wye-branching optical circuit comprising an input waveguide, a branching portion connected to said input waveguide, and at least two output waveguides connected to said branching portion, said waveguides being single mode waveguides or multi-mode waveguides in which only several modes are propagated, said waveguides being formed in a substrate, wherein a portion of said input waveguide is a low effective refractive index waveguide where higher order modes are cut-off, and the effective refractive index of a fundamental mode is lower than in the other waveguides formed in said substrate, wherein said low effective refractive index waveguide portion has a refractive index smaller than a refractive index of said input waveguide by 0.0004.

9. The wye-branching optical circuit as recited in claim 1, wherein the refractive index of said low effective refractive index waveguide portion is approximately 0.50 to 0.90 times a refractive index of said incident and output waveguides.

* * * * *